United States Patent [19]
Stewing

[11] Patent Number: 5,288,947
[45] Date of Patent: Feb. 22, 1994

[54] CABLE JUNCTION BOX

[75] Inventor: Albert Stewing, Dorsten, Fed. Rep. of Germany

[73] Assignee: Stewing Kunststoffbetrieb GmbH, Dorsten, Fed. Rep. of Germany

[21] Appl. No.: 906,151

[22] Filed: Jun. 29, 1992

[30] Foreign Application Priority Data

Jun. 27, 1991 [DE] Fed. Rep. of Germany ....... 9107912
Jun. 27, 1991 [DE] Fed. Rep. of Germany ....... 9107913

[51] Int. Cl.$^5$ .......................................... H02G 15/113
[52] U.S. Cl. .................................. 174/92; 174/77 R; 174/93
[58] Field of Search .......................... 174/77 R, 92, 93

[56] References Cited

U.S. PATENT DOCUMENTS

| | | | |
|---|---|---|---|
| 2,621,228 | 12/1952 | Tompers | 174/93 |
| 2,996,567 | 8/1961 | Channell et al. | 174/92 |
| 4,495,816 | 1/1985 | Morel et al. | 174/92 |
| 4,538,021 | 8/1985 | Williamson, Jr. | 174/92 |
| 4,712,285 | 12/1987 | Morel et al. | 29/458 |
| 4,845,314 | 7/1989 | Pichler et al. | 174/92 |
| 4,933,512 | 6/1990 | Nimiya et al. | 174/92 |
| 5,113,038 | 5/1992 | Dehling | 174/92 |

FOREIGN PATENT DOCUMENTS 2172449 9/1986 United Kingdom .................. 174/93

Primary Examiner—Morris H. Nimmo
Attorney, Agent, or Firm—Anderson Kill Olick & Oshinsky

[57] ABSTRACT

A cable junction box for connecting and branching communication cables with a longitudinally divided socket tube and closure sections bounding the longitudinal division, with sealing members, embraced by the socket tube, being provided with cable passages adaptable to different cable diameters, and peripheral seals arranged between the socket tube and the sealing members, the socket tube having a circumferential jacket reinforcement extending to the region of its longitudinal division on both its both end faces, the longitudinally divided socket tube additionally having a groove section for receiving a longitudinal seal and a spring section engaging into the grooved section for compressing the longitudinal seal so that the longitudinal seal is pressed against the peripheral seals, the longitudinal groove of the grooved section have a chamber constriction in a region devoid of inner legs.

7 Claims, 4 Drawing Sheets

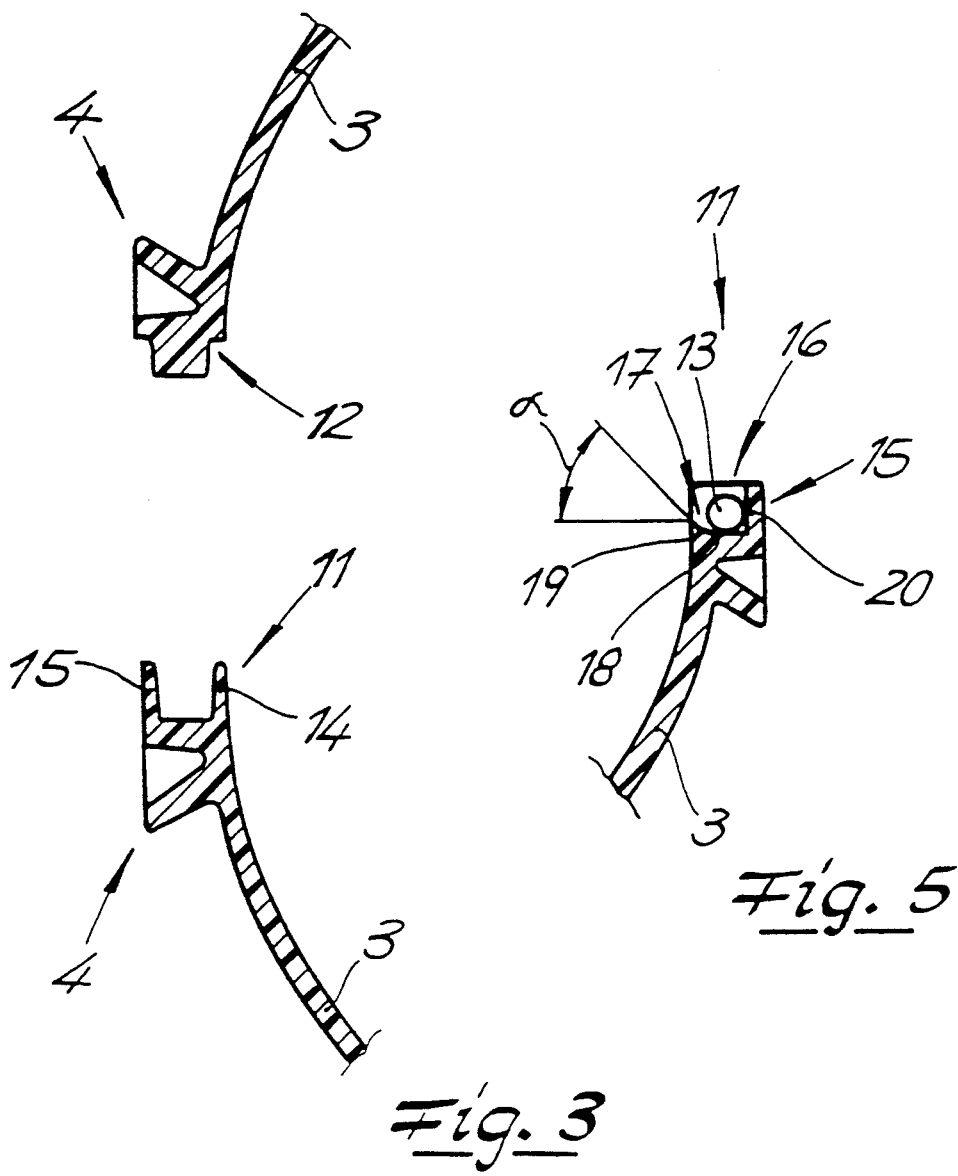

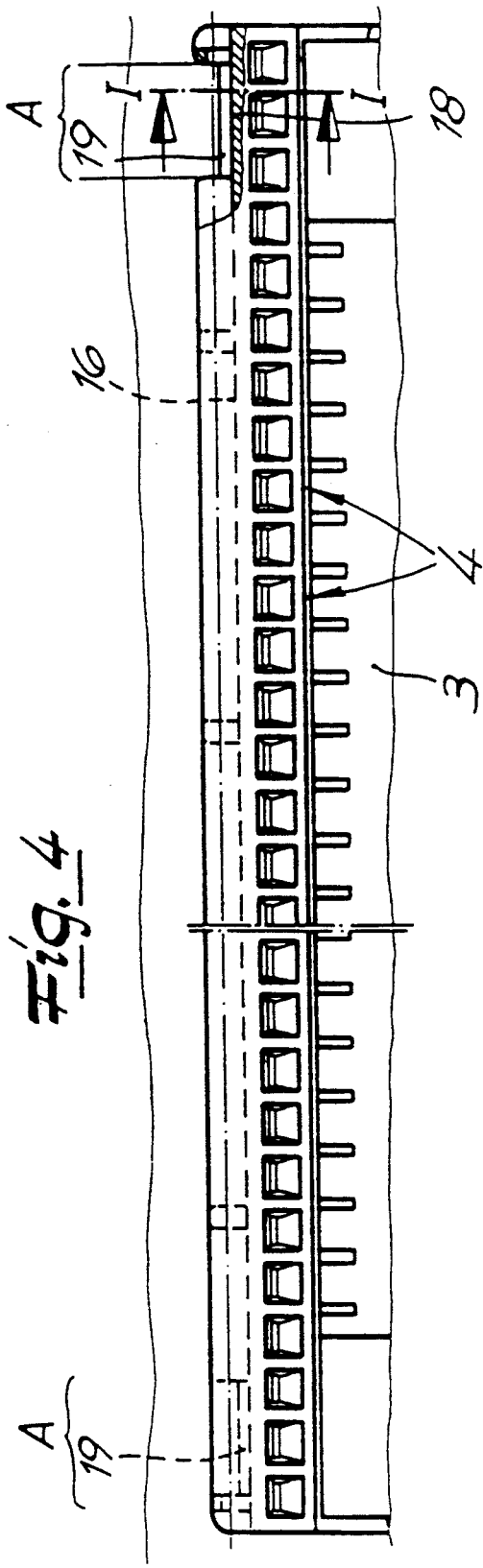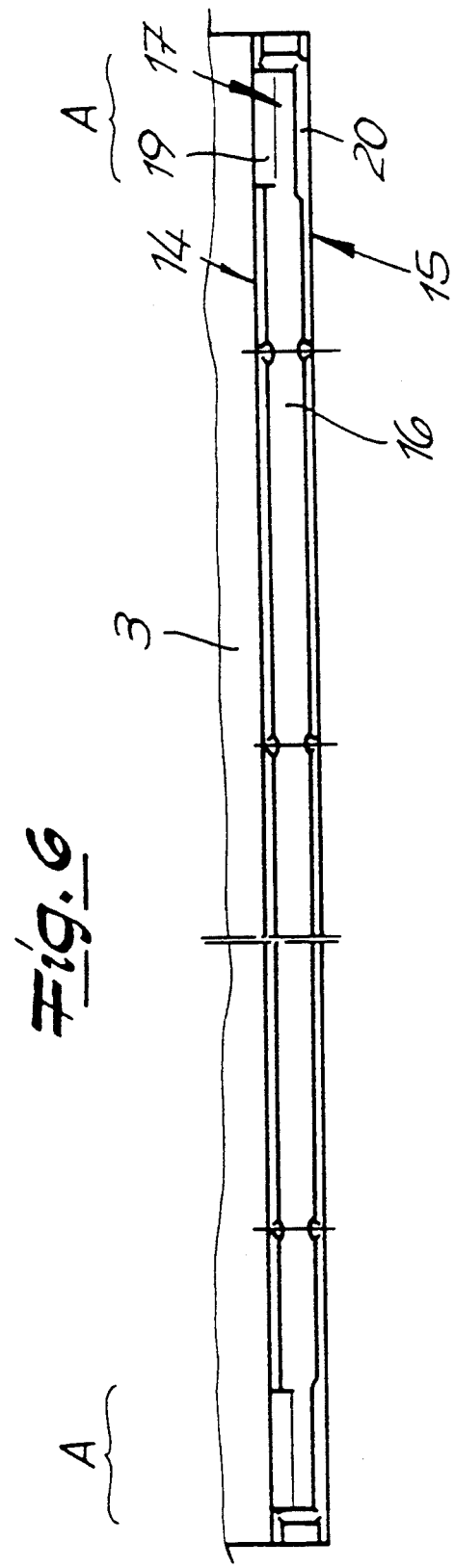

CABLE JUNCTION BOX

BACKGROUND OF THE INVENTION

The invention is directed to a cable junction box for connecting or branching cables, especially communication cables, with a longitudinally divided socket tube with locking-sections bounding the longitudinal division. Sealing members are embraced by the tubular box for closure or sealing of its ends, with the sealing members comprising cable passages adaptable to different cable diameters. Also, peripheral or circumferential seals are disposed in circular locating grooves between the socket tube and the sealing members.

With such cable junction boxes, which as a rule are laid underground, a sound seal of the socket tube against the sealing member must naturally be achieved. On the one hand, peripheral seals are provided for this purpose and, on the other hand, the socket tube is clamped together not only in the region of the longitudinal division by one more closure clamps which under- and overlap the closure sections, but they also exert clamping forces on the sealing member in order to press the peripheral seals into their locating grooves. Since the socket tube is fabricated out of a plastic sleeve of comparatively small thickness, for instance 4 mm, excessive elongation or expansion and a widening resulting therefrom cannot be excluded during application of a clamping force upon the sealing members. Such an excessive elongation or widening can, however, lead to an impairment of the sealing of the socket tube against the sealing member.

SUMMARY OF THE INVENTION

Accordingly, it is an object of the present invention to provide a cable junction box for connecting and branching cables, in particular communication cables, of the previously described type, where an excessive elongation and final widening of the socket tube is prevented in the course of closing the tube to obtain a sound seal of the socket tube against the sealing member.

Pursuant to this object, and others which will become apparent hereinafter, one aspect of the present invention resides in providing the socket tube, in the region of its two end faces, with an annular jacket reinforcement in the region of the longitudinal position. This reinforcement of the jacket prevents an extension and finally a widening of the socket tube in the region of its end faces when clamping or reclamping the sealing members while performing the closing operation with a closing or tightening clamp.

According to a further embodiment of the invention, the jacket reinforcement is configured in a simple manner as a material thickening of predetermined width and thickness that projects beyond the circumferential direction on each end of the tube. Herein the width of the material thickening or jacket reinforcement can correspond to the width of the sealing members, while the thickness of the material thickening is, for instance, approximately half the tube thickness. In any case, the reinforcement is configured in such a way that pressure extensions and widenings can no longer occur. The jacket reinforcement or material thickening can be configured, because of fabrication technology, in a simple manner as external moldings from the same plastic material as the jacket.

In such cable junction boxes the longitudinally divided socket tube comprises as a rule a groove/spring connection for the longitudinal separation. The connection includes a U-shaped grooved section for receiving a longitudinal seal and a spring section engaging into the grooved section for exerting pressure upon the longitudinal seal and for closing the socket tube on the end faces from the sealing member jacketed by said socket tube with the peripheral seals pressed into peripheral grooves between the socket tube and the sealing member. The U-shaped grooved section comprises an inner leg extending in the peripheral direction of the socket tube and an outer leg, and in the region where the longitudinal seal and the peripheral seal cross each other the inner leg is removed and the longitudinal seal is pressed against the peripheral seal. In this respect, the problem was to create a cable junction box where a particularly firm compression of the longitudinal seal together with the peripheral seal is achieved in the crossing regions so that the sealing effect is optimized.

The invention solves this task in a cable junction box of the generic type in that the longitudinal groove comprises a chamber constriction in those regions where the inner legs have been removed. These measures in the invention entail that, when closing the socket tube and consequently with the penetration of the spring section into the grooved section, the longitudinal seal is compressed to a higher degree in the region of the chamber constriction. Because of this extreme compression of the longitudinal seal it exits from the regions with no internal legs and as it were espouses the peripheral seals entailing a high specific area pressure. In this way the sealing effect is optimized in the crossing regions of the longitudinal seal and the peripheral seal, and this even taking into account that we are merely dealing with round cord- or O-ring-seals in the longitudinal and peripheral seals, without providing any particular additional shapes for the crossing regions, although the round cord- or O-ring-seals when unchanged can also exhibit special shape adaptations.

In order to be able to carry the increased compression- or pressure problems without any difficulties in the course of compressing the longitudinal seals in the region of the chamber constrictions, the invention further provides, and this is of independent significance, that the external leg of the grooved section is configured as a strengthened leg in the crossing regions of the longitudinal seals and the peripheral seals or in the region devoid of internal legs. For this purpose the external leg can for instance comprise a leg thickening from the same plastic material. In this way care is taken that the external leg cannot give way in the region of the chamber constriction, but rather it can carry the increased compression forces occurring there without any difficulty, so that the increased compression of the longitudinal seal against the peripheral seal is in fact fully effective with generation of appropriately higher specific area pressures.

The chamber constriction can be achieved in a number of different ways. Thus the invention provides for the chamber constriction to be formed by a groove base rising against the region devoid of inner legs. Preferably, the rise of the groove base is configured as a molding pulled-in in a wedge-shaped or arc-shaped manner, which runs out or terminates with the formation of an acute angle in the inside face of the socket tube. In this way, an almost wedge-shaped escape of the longitudinal seal during its compression and consequently also a particularly high specific area pressure are achieved between the circumferential seal and the longitudinal seal in the crossing regions of the longitudinal seal and the peripheral seal.

In the final analysis, the teaching of the present invention realizes a cable junction box for the connecting or branching-off of cables, especially communication cables, which is distinguished by a simple construction even when using conventional round core- or O-ring-seals for the longitudinal seals and the peripheral seals for an optimum sealing effect even in the crossing regions of these seals, because a particularly firm compression of the sealing material with generation of high specific area pressures without over-extension and widening of the socket tube is achieved when closing the tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3 is a cross-section through the tubular box in the longitudinal division region;

FIG. 4 is a side view of FIG. 3;

FIG. 5 is a section I—I in FIG. 4; and

FIG. 6 is a plan view of the object in FIG. 4.

DETAILED DESCRIPTION OF THE PREFERRED EMBODIMENTS

Figure 1:
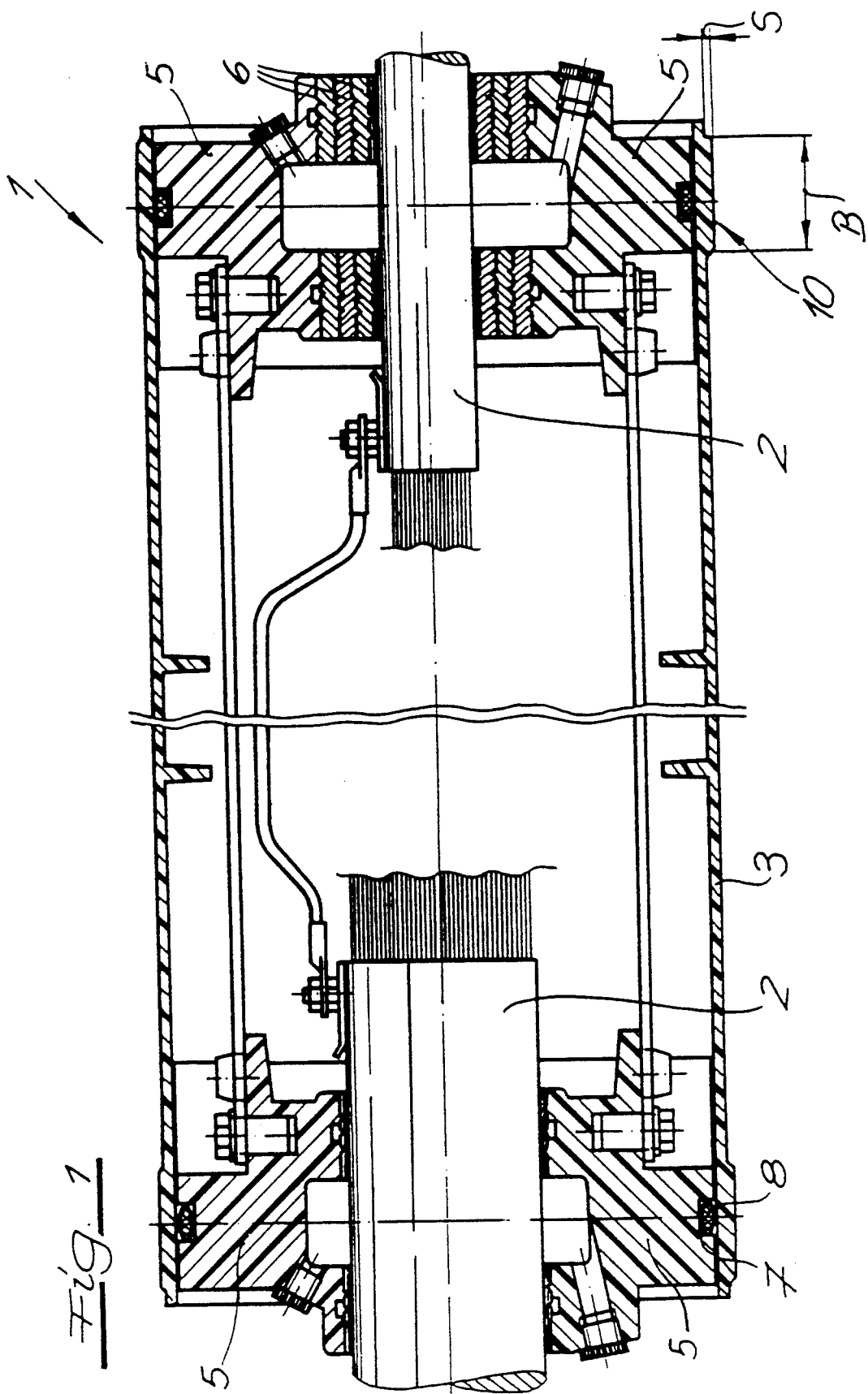
Fig. 1 shows a cable junction box pursuant to the invention, diagrammatically in axial section.
Figure 2:
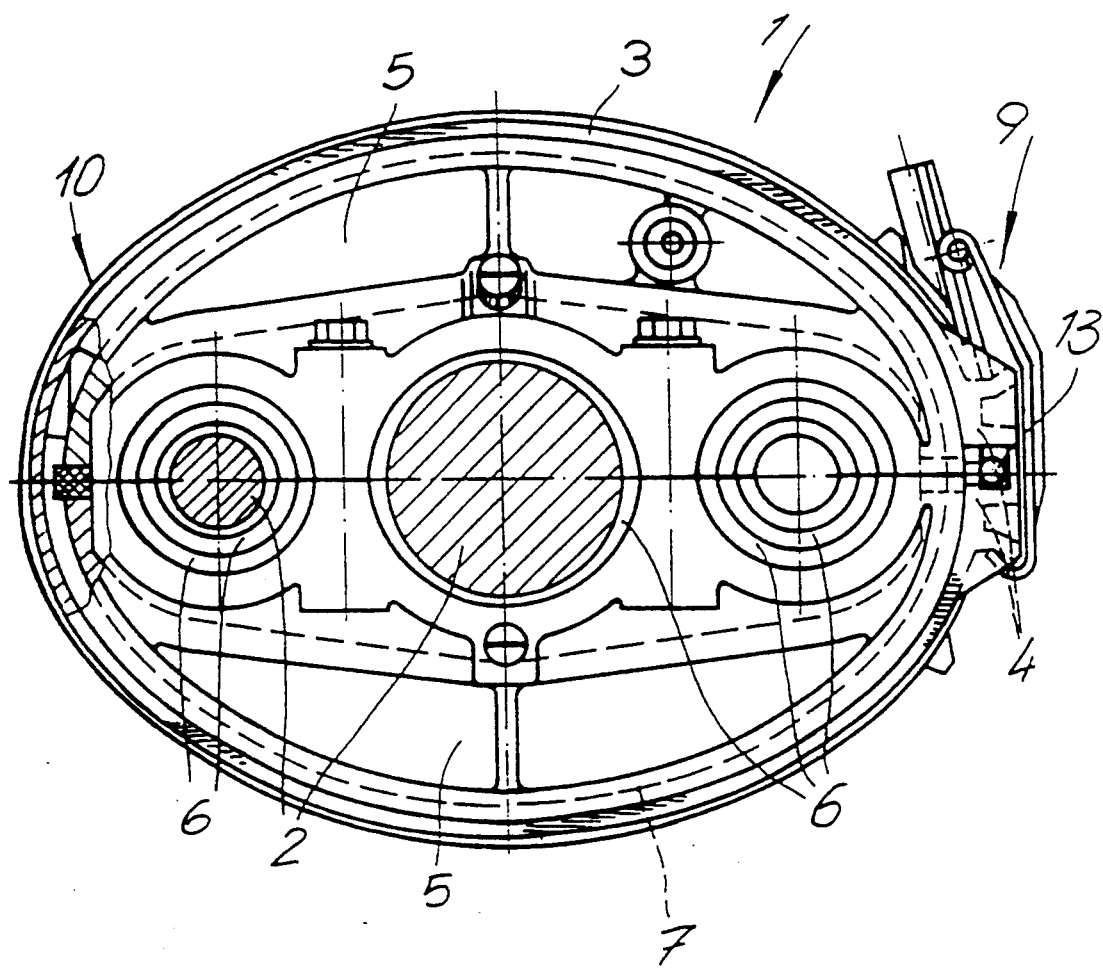
FIG. 2 is a diagrammatic front view of the junction box of FIG. 1.

A cable junction box 1 for connecting and branching cables 2, especially communication cables, is shown in the figures. In its basic construction the box 1 comprises a longitudinally divided socket tube 3 of plastic material, and locking sections 4 bounding the longitudinal division. Sealing members 5 are embraced by the socket tube 3 for end face closing of the socket tube 3 and have cable passages 6 adaptable to different cable diameters, and peripheral seals 8 that are pressable into circular location grooves 7 between the socket tube 3 and the sealing members 5. The closure of the socket tube 3 is achieved by means of closure clamps 9 overlapping and underlapping the closing sections 4, so that the socket tube 3 is not only clamped in the region of its longitudinal division, but compressive stress is also exerted upon the sealing members 5 and consequently upon the peripheral seals 8, as well as compressive stress being exerted upon the sealing members 5 and the peripheral seals 8 from all directions. In order to avoid an over-extension or widening of the plastic socket tube 3, which might result from the above-mentioned clamping, the socket tube 3 comprises a circular jacket reinforcement 10 that extends in the region of both ends of the tube up to the area of the longitudinal division The jacket reinforcements 10 are configured as material thickenings of predetermined width B and thickness S and they axially protrude on both sides beyond peripheral seals 8.

In a preferred embodiment, the width B of the jacket reinforcement 10 amounts to approximately 50 mm and its thickness S to approximately 2 mm, so that a 4 mm thick socket tube 3 has an overall thickness of 6 mm in the region of the jacket reinforcement 10. Naturally other dimensions can also be chosen. The reinforcements 10 are configured as external moldings and can therefore be easily fabricated.

For closing the longitudinal division itself, a groove-spring connection 11, 12 having a U-shaped grooved section 11 for receiving a longitudinal seal 13 is provided at one tension or butt-edge, and a spring section 12 engaging into the grooved section at the other butt edge of the longitudinal division for compressing the longitudinal seal 13. The closure- and compression forces are produced by the closing clamp 9.

The U-shaped grooved section 11 comprises an inner leg 14 extending in the peripheral direction of the socket tube 3, and an outer leg 15. The inner leg 14 is removed or eliminated in the region of the crossover of the longitudinal seal 13 and the peripheral seals 8, so that the grooved section 11 is open towards the internal side of the tube. Thus, the longitudinal seal 13 is pressed against the peripheral seals 8 during the course of closing the socket tube 3.

The longitudinal groove 16 of the grooved section 11 has a chamber constriction 17 in the regions A which do not carry internal legs, in order to achieve there a particularly high compression of the longitudinal seal 13 and consequently a particularly intensive espousing of the longitudinal seal 13 against the peripheral seals 8 with generation of high specific area pressures. The chamber constriction 17 is formed by a groove base 18 of the grooved section 11 that rises against the region which does not carry any internal legs. The rise of the groove base 18, according to the illustrated embodiment, is configured as a molding 19 pulled-in in an arc-shaped fashion, which terminates or runs out at the internal surface of the socket tube 3 to form an acute angle α. In order to be able to carry stresses occurring in the course of the increased compression of the longitudinal seal 13 without problems, the external leg 15 of the grooved section 11 is thickened 20 in the region devoid of internal legs, thus, the external leg 15 is configured as a strengthened leg there.

While the invention has been illustrated and described as embodied in a cable junction box, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A cable junction box for connecting and branching cables, comprising:
    a longitudinally divided socket tube having closure sections that bound longitudinal divisions of the tube;
    sealing members braced by the socket tube so as to form closures of end faces of the socket tube, the sealing members having cable passages adaptable to different cable diameters;

peripheral seals disposed between the socket tube and the sealing member;

a peripheral jacket reinforcement provided at each end of the socket tube so as to extend up to a region of the longitudinal division; and groove/spring connecting means for connecting together the longitudinally divided socket tube, the connecting means including a U-shaped grooved section for receiving a longitudinal seal and a spring section that is engageable into the grooved section so as to compress the longitudinal seal, the U-shaped grooved section comprises an inner leg extending in a peripheral direction of the socket tube and an outer leg which define a longitudinal groove between them, the inner leg being removed in a region of crossing of the longitudinal seal and the peripheral seals, the longitudinal seal being pressable against the peripheral seals and the longitudinal groove has a chamber constriction in regions devoid of inner legs.

2. A cable junction box according to claim 1, wherein the sealing members have grooves in which the peripheral seals are arranged.

3. A cable junction box according to claim 1, wherein the chamber constriction is formed by a base of the longitudinal groove that rises against the region devoid of inner legs.

4. A cable junction box according to claim 3, wherein the rise of the groove base is a molding that is recessed in a wedge-shaped manner, and terminates in an inner surface of the socket tube with an acute angle.

5. A cable junction box according to claim 3, wherein the rise of the groove base is a molding that is recessed in an arc-shaped manner, and terminates in an inner surface of the socket tube with an acute angle.

6. A cable junction box according to claim 1, wherein the outer leg is reinforced in the regions of the socket tube devoid of inner legs.

7. A cable junction box according to claim 6, wherein the reinforced regions of the outer leg are formed by a thickened portion of the outer leg.

* * * * *